United States Patent [19]

Etemad et al.

[11] Patent Number: 4,834,633

[45] Date of Patent: May 30, 1989

[54] SCROLL MACHINE WITH WRAPS OF DIFFERENT THICKNESSES

[75] Inventors: Shahrokh Etemad, E. Syracuse; Donald Yannascoli, Fayetteville, both of N.Y.; Michael Hatzikazakis, Bristol, Tenn.

[73] Assignee: Carrier Corporation, Syracuse, N.Y.

[21] Appl. No.: 239,060

[22] Filed: Sep. 2, 1988

Related U.S. Application Data

[60] Division of Ser. No. 942,732, Dec. 17, 1986, Pat. No. 4,726,100, which is a continuation of Ser. No. 125,914, Nov. 27, 1987, abandoned.

[51] Int. Cl.$^4$ .............................................. F01C 1/04
[52] U.S. Cl. .......................................... 418/1; 418/55
[58] Field of Search ............................... 418/55, 1, 39; 29/156.4 R

[56] References Cited

U.S. PATENT DOCUMENTS

| | | | |
|---|---|---|---|
| 1,376,291 | 4/1921 | Rolkerr | 418/55 |
| 4,082,484 | 4/1978 | McCullough | 418/55 |
| 4,382,754 | 5/1983 | Shaffer et al. | 418/55 |
| 4,490,099 | 12/1984 | Terauchi et al. | 418/55 |

FOREIGN PATENT DOCUMENTS

58-222901 12/1983 Japan ...................................... 418/55

Primary Examiner—John J. Vrablik
Attorney, Agent, or Firm—David J. Zobkiw

[57] ABSTRACT

A scroll compressor can be provided with different wrap thicknesses to compensate for the different material properties of the orbiting and fixed scroll elements. The concept of different wrap thicknesses also aids in the select-fitting of parts and in the provision of and adjustment of a clearance or spacing between the wrap elements. Additionally, in the manufacture of a scroll compressor, the total wrap thickness of the two wraps is kept constant within narrow tolerances while the individual wrap thicknesses are allowed to vary over a predetermined range. The cutting tools used are sized such that even if they differ in their cutting diameters, the combined cutting diameters, and therefore the total wrap thicknesses, are constant within narrow tolerances. This permits the tools to be used and resharpened until their cutting diameters fall below the minimum acceptable diameter.

4 Claims, 3 Drawing Sheets

SCROLL MACHINE WITH WRAPS OF DIFFERENT THICKNESSES

This application is a division, of application Ser. No. 942,732 filed Dec. 17, 1986, now U.S. Pat. No. 4,726.100, which is a continuation of application Ser. No. 125,914, filed Nov. 27, 1987, abandoned.

BACKGROUND OF THE INVENTION

Scroll machines can be used to compress, expand or pump fluids and include two scroll members each of which has a circular end plate and a spiral or involute wrap. The scroll members are maintained angularly and radially offset so that both wraps interfit to make either a plurality of line contacts or are spaced by minimum clearance between the wraps to thereby define at least one pair of fluid pockets or chambers. One scroll member is stationary and the other orbits due to an eccentric shaft and an antirotation coupling. The relative orbital motion of the two scroll members shifts the line contacts or minimum clearances along the curved surfaces of the wraps so that the trapped volumes in the fluid pockets change in volume. The trapped volumes can increase or decrease depending upon the direction of orbiting motion. Because several trapped volumes generally exist at the same time, several line contact or minimum clearance points also exist at the same time with each moving along the wraps with movement being towards the center or discharge port in the case of a compressor. Since the points of line contact or minimum clearance represent locations of potential wear and/or leakage, it is imperative that the scroll wraps be accurately machined and matched.

Since the fixed and orbiting scroll wraps are of the same configurations but are angularly and radially offset with respect to each other, the machined slots defining the wraps are of the same width or radial extent. However, inaccuracies in the machine process, tool wear, differential thermal expansion, etc. can negatively influence the uniformity of dimensions with resultant interference or leakage. Additionally, it may be desirable to coat the wrap(s) with a suitable surface coating which can change the dimensions of the wrap(s).

SUMMARY OF THE INVENTION

Scroll machines have the advantages of few parts, compactness, valveless operation, a low rubbing speed, low-vibration, uniform torque and high volumetric efficiency. However, the design of a scroll machine has to treat three major areas, the manufacturing of the scroll members, leakage and the bearing loads due to a cantilever loading configuration. The bearing load is due to a combination of gas forces and the centrifugal force of the orbiting scroll which is located off center from the center of rotation of the shaft. The centrifugal force can be reduced by selecting a light weight material such as aluminum or plastic for the orbiting scroll. An attendant benefit is a reduction in the size of the counterweight and thereby a more compact machine is possible. Where a contact exist between the scroll members and on the thrust surface, there must be material compatibility between the parts which means that the two scroll members can be of different materials as where one scroll member is of aluminum and the other is of cast iron. Thus, to maintain the same structural integrity, different wrap thicknesses may be required.

Conventionally, the machining of the slot between the wraps is conducted such that the cutting tool machines on only one side of a wrap. This requires the milling cutter to travel from the outside diameter all the way to the center to cut one side of the wrap and to travel back the full distance to cut the other side of the wrap. However, by machining the wraps on both sides at the same time, the wrap manufacturing time, which is a large portion of the total time, will be halved. The penalty for this reduction is manufacturing time is to simultaneously do "conventional" milling on one side and "climbing" milling on the other side. Because of this approach higher tool wear may result as compared to standard milling operation.

A new cutting tool is larger in its cutting diameter than the equal or average slot widths for both scroll wraps by an amount equal to the maximum reduction in the cutting diameter relative to the equal slot width plus twice the desired minimum clearance or spacing if a line contact is not used. A typical permissible range of cutter diameter reduction due to sharpening and wear is on the order of a few thousandths to one or two tens of thousandths of an inch and the minimum clearance for the case of no line contact is on the order of a thousandth of an inch. Since a scroll wrap is typically on the order of 0.1 to 0.2 inches thick, a reduction in thickness on the order of one or two tens of thousandths of an inch does not jeopardize the structural integrity of the wrap. If a clearance is used, this avoids a metal-to-metal contact between the fixed and orbiting wraps and the attendant potential for wear, surface damage and higher frictional losses. In addition to reducing the scroll wrap thickness to provide the clearance, it can also be used to compensate for the thickness of any surface coating which is to be added after the machining operation. Since a cutting tool's diameter will decrease due to wear and/or sharpening, the tool diameter chosen for cutting one of the wraps can accommodate a reduction in diameter of a second tool used to cut the other one of a pair of wraps. Obviously, the use of different diameter tools for cutting the pair of wraps will result in different wrap thicknesses for the two wraps. By maintaining constant, within narrow tolerances by selective assembly, the combined wrap thicknesses plus the minimum clearance or spacing, if used, the full use of the tool can be obtained while maintaining the dimensional requirements.

It is an object of this invention to provide a scroll assembly with different wrap thicknesses.

It is another object of this invention to permit the sharpening and use of tools without compromising dimensional requirements of the machined part during the manufacturing of scroll members.

It is a further object of the invention to reduce the manufacturing time of a scroll wrap.

It is an additional object of this invention to balance the critical design aspects of manufacturing the scroll, bearing loads and leakage and achieve suitable performance of a scroll machine.

It is another object of this invention to maintain a required radial clearance or spacing in a scroll assembly by controlling the wrap thickness of both wraps. These objects, and others as will become apparent hereinafter, are accomplished by the present invention.

Basically, in the machining of the two wraps of a scroll compressor the total wrap thickness of both scrolls is maintained constant even though the wrap thicknesses are not necessarily the same. The cutting tools used are sized such that even if they differ in their cutting diameters, the combined cutting diameters of selected pairs of scroll members are constant. The result is that the individual slot width and wrap thicknesses of one scroll member may vary over predetermined range as long as the corresponding scroll member of the pair has a slot width and wrap thickness such that the combined slot widths and the wrap thicknesses are each of a constant value. The minimum clearance or spacing, if used, would also be fixed.

BRIEF DESCRIPTION OF THE DRAWINGS

For a fuller understanding of the present invention, reference should be made to the following detailed description thereof taken in conjunction with the accompanying drawings wherein.

DESCRIPTION OF THE PREFERRED EMBODIMENT

Figure 1:
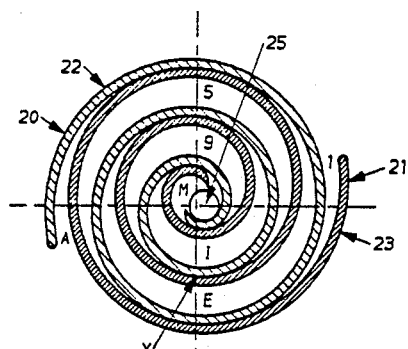
FIGS. 1-4 are schematic views sequentially illustrating the relative positions of the wraps of 90° intervals of orbit.
Figure 2:
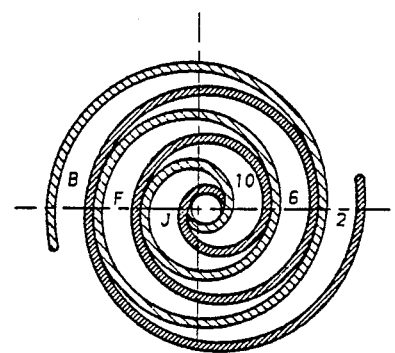
Figure 3:
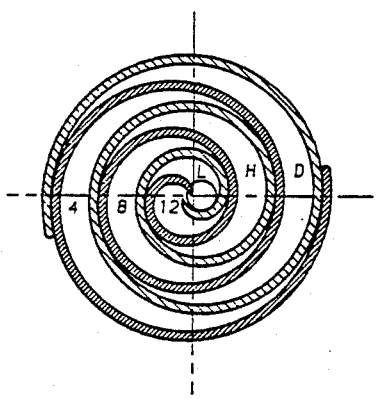
Figure 4:
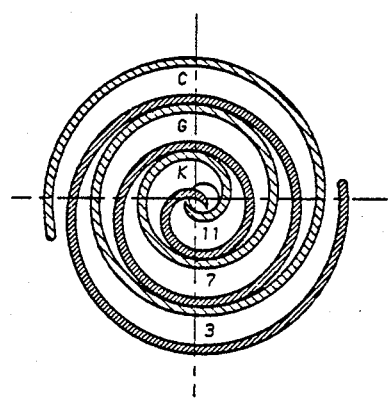

In FIGS. 1-4, the numeral 20 generally indicates the fixed scroll and the numeral 21 generally indicates the orbiting scroll. The chambers labeled A-M and 1-12 each serially show the suction, compression and discharge steps with chamber M being the common chamber formed at discharge 25 when the device is operated as a compressor. It will be noted that chambers 4-11 and D-K are each in the form of a helical crescent or lunette approximately 360° in extent with the two ends being points of line contact or minimum clearance between the scroll wraps. If, for example, point X in FIG. 1 represents the point of line contact or of minimum clearance separating chambers 5 and 9 it is obvious that there is tendency for leakage at this point from the high pressure chamber 9 to the lower pressure chamber 6 and that any leakage represents a loss or inefficiency. To minimize the losses from leakage, it is necessary to maintain close tolerances and to run at high speed.

Again referring to FIGS. 1-4, it will be noted that there is a symmetry in that chambers 1-12 correspond to chambers A-L with a difference being that they are on opposite sides of the wraps 22 and 23. Because of this symmetry, it has been the standard practice to make both slot widths equal. However, several factors can make it desirable for the slot widths to be unequal as where the wrap is being cut on both sides at once.

Unlike single side cutting of the wrap where the tool can be moved to correct for wear and/or sharpening, double sided cutting reduces the slot width/thickens the wrap as the tool wears or is sharpened. This variable wrap thickness can be desirable under various sets of circumstances. For example it permits changes in the design of both wrap thicknesses and the radius of orbit of the crank, and, if the radius of orbit is maintained constant it permits the individual wrap thickness to vary so long as their combined thickness remains constant. The variable wrap thickness impacts manufacturing, performance and design. With respect to manufacturing, it accommodates the wear and sharpening of the cutter in a double sided cutting operation. With respect to performance, it permits the reduction of leakage by select fitting of the scroll elements to hold tolerances and to adjust the clearance or spacing. As to design, it permits the reduction of bearing loads and greater compactness by permitting different materials to be used for the scroll members to reduce the weight while providing structural integrity and material compatibility.

While the reduction in tool diameter due to wear and sharpening cannot be avoided, it can be anticipated so that it is used in the present invention to produce and maintain closer tolerances. Because small dimensional changes can have a major impact on leakage between chambers but has little effect on the structural integrity of the wraps, it is more important to maintain the minimum clearance or the line contact dimensions. So, rather than just selecting a slot width and using the tools until wear and sharpening has made them cut too narrow of a slot width, a range on either side of the equal or nominal slot width is employed. As a result the useful range of tool use is doubled. Specifically, a design slot width, W, and wrap thickness, T, are chosen and a tool with a cutting diameter of $W+\delta$ is used to cut the slot producing a wrap thickness of $T-\delta$ where $\delta$ is the amount of deviation permitted from the design slot width W. As the tool wears and is resharpened it will be used until its cutting diameter is reduced to $W-\delta$ and the wrap thickness has increased to $T+\delta$. Matching wraps cut with a slot width of $W+\delta$ with those cut at a width of $W-\delta$ will result in an average slot width of W and an average wrap width of T. The wraps over the entire range of slot widths from $W+\delta$ to $W-\delta$ will be similarly selectively paired to produce an average slot width of W and an average wrap width of T for each pair of scroll members. If a clearance or spacing, S, is desired than the maximum tool diameter would be increased to $W+\delta+2S$ and the resultant wrap would be matched with one cut at a width of $W-\delta$ for an average slot width of $W+C$ and an average wrap thickness of $T-S$. To create a clearance or spacing of S, it is necessary to cut the slot 2S wider because half of the increase is on the side of the wrap defining the trapped volume. The wraps are thus matched over the whole range of tool sizes such that the average slot widths are W, or $W+S$ if a clearance or spacing is used, and the average wrap thickness is T, or $T-S$ if a clearance or spacing is used. Matching is aided by noting the predicted wear rates and by sharpening the tool to standard sizes.

Each tool can be used over its full life to cut just fixed or just orbiting scrolls. However, by always using the wider/new tools on just one type of scroll and the narrower/worn tools on the other type of scroll the number of different sized parts can be halved. Where different materials are used for each of the scroll members, it may be desirable to cut the thinner wrap into the stronger material.

Figure 5:
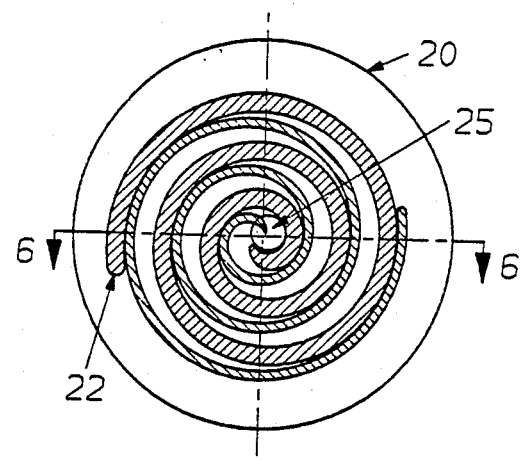
FIG. 5 is a sectional view taken along line 5—5 of FIG. 6.
Figure 6:
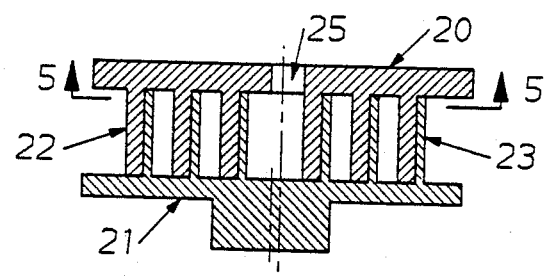
FIG. 6 is a sectional view taken along line 6—6 of FIG. 5.
Figure 7:
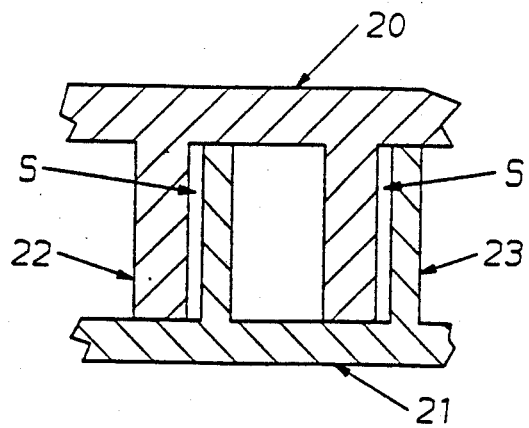
FIG. 7 is an enlarged view of a portion of FIG. 6.

FIGS. 5-7 show the differences in slot widths and wrap thickness on an exaggerated basis and for an extreme condition. As a minimum clearance or spacing, S, if used, would only be on the order of thousandths of an inch, the drawings of the scrolls for a device using line contact and one using a minimum clearance or spacing S are the same unless the clearance is greatly exaggerated as shown in FIG. 7. In FIGS. 5-7, fixed scroll 20 is shown with a narrow slot width and a thick wrap 22 while orbiting scroll 21 is shown with a wide slot width and a thin wrap 23.

Figure 8:
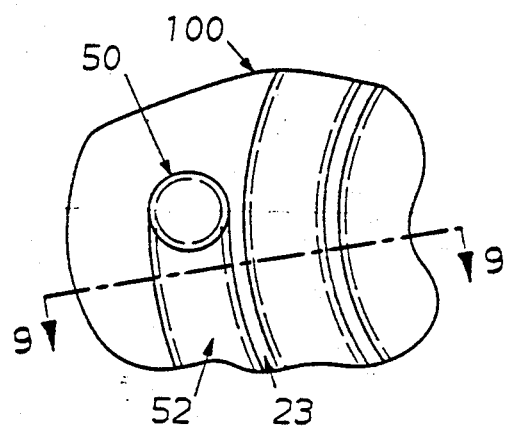
FIG. 8 is a view of a tool cutting a scroll wrap.
Figure 9:
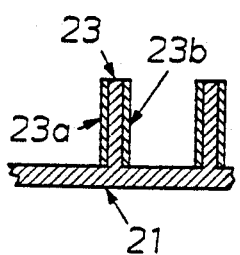
FIG. 9 is a sectional view of a portion of a wrap taken along line 9—9 of FIG. 8.

The cutting of wrap 23 in blank 100 is illustrated in FIG. 8 although the drawing applies equally to the cutting of wrap 21. Tool or milling cutter 50 is shown in solid and cuts slot 52 into blank 100 leaving wrap 23. A sharpened or worn tool 50 is illustrated in phantom and would cut a narrower slot 52 and would leave a wider wrap 23 as shown in phantom. The differences between the solid and phantom lines illustrating tool 50 and slot 52 indicate the range of tool wear and the slot width/wrap thickness variation. The range of wrap thickness is also illustrated in FIG. 9 where a portion of scroll 21 with a minimum wrap thickness for wrap 23 is indicated by a uniform cross hatching. The thickness of wrap 23 can be increased within the range indicated by cross hatched portions 23a and b which together with 23 represent the maximum wrap thickness when the smallest tool is used. The portions 23a and b removed/left will be the same on each side of wrap 23 and 23a and b are each equal to $\delta$ or $\delta + S$.

Except for the foregoing described method of manufacture and the resulting scrolls having different wrap thicknesses, and, if desired different materials which may reduce the bearing load and the size of the counterweight, the other components and the method of operation would be conventional and is therefore not believed to require any further description.

Although a preferred embodiment of the present invention has been illustrated and described, other modifications will occur to those skilled in the art. It is therefore intended that the present invention is to be limited only by the scope of the appended claims.

What is claimed is:

1. A scroll machine including first and second scroll members having first and second wraps which are of selectable uniform thickness with said selectable uniform thickness of said first and second wraps being selectable over a range of thicknesses provided that said first and second wraps have a fixed combined thickness.

2. The scroll machine of claim 1 wherein said first and second wraps are of different thicknesses.

3. The scroll machine of claim 1 wherein said first and second wraps are always radially separated by at least a predetermined distance over their entire lengths.

4. The scroll machine of claim 1 wherein said range of thicknesses extends for a few thousandths of an inch.

* * * * *